United States Patent [19]
Fishwick et al.

[11] 3,942,977
[45] Mar. 9, 1976

[54] PROCESS FOR MAKING IRON OR STEEL UTILIZING LITHIUM CONTAINING MATERIAL AS AUXILIARY SLAG FORMERS

[75] Inventors: John Henry Fishwick, Downingtown, Pa.; Emile O. Dahlen, Birmingham, Ala.

[73] Assignee: Foote Mineral Company, Exton, Pa.

[22] Filed: Mar. 24, 1975

[21] Appl. No.: 561,189

[52] U.S. Cl. .............................. 75/30; 75/53; 75/94
[51] Int. Cl.² ......................................... C21C 7/00
[58] Field of Search .................. 75/30, 94, 53–58, 75/129 R, 130 R; 148/26

[56] References Cited
UNITED STATES PATENTS

| | | | |
|---|---|---|---|
| 2,181,096 | 11/1939 | Ness | 75/58 |
| 3,309,196 | 3/1967 | Kaneko et al. | 75/94 |
| 3,501,291 | 5/1970 | Schneider | 75/53 |
| 3,704,744 | 12/1972 | Halley et al. | 75/94 |

*Primary Examiner*—M. J. Andrews
*Attorney, Agent, or Firm*—Howson and Howson

[57] ABSTRACT

A process for the manufacture of iron or steel utilizing lime as a flux improved through use of a lithium containing material as an auxiliary flux.

10 Claims, No Drawings

PROCESS FOR MAKING IRON OR STEEL UTILIZING LITHIUM CONTAINING MATERIAL AS AUXILIARY SLAG FORMERS

DESCRIPTION OF THE INVENTION

This invention relates to the art of producing iron or steel and more specifically, to an improved method for slag development in such procedures.

The pyrometallurgical production of iron or steel is well known. The pyrochemical reactions involved in removal of impurities, or non-metallic inclusions, in the production of iron and steel through interaction with fluxes to form a slag are likewise well known. The art, however, continually seeks improvement in both the rate and the efficiency of slag development in iron and steel making processes.

The term "iron making" as used herein refers to the production of what is commonly known as cast iron. Cast iron is a ferrous alloy containing about 2.2 to about 4.2% carbon and can be made as gray iron, ductile (nodular) iron, white iron, mottled iron and malleable iron. "Steel" as used herein refers to all types of ferrous materials containing less than 0.2 to over 0.5% carbon and includes low alloy and high alloy steel varieties. Iron, as described herein, may be made by any conventional process such as by blast furnace, cupola, reverberatory-, electric-, induction and rotary furnaces. Likewise, steel, as described herein, may be made by any conventional process such as the BOF, open hearth, electric furnace, induction furnace or crucible process.

It is important that the slag be kept fluid, not only to increase its ability to scavenge impurities from molten metal, but also to permit the slag to be readily removed from the cupola, furnace or other vessel in which it is produced. Lime finds universal acceptance as a flux in the production of iron or steel. Lime may be used as a flux in the form of CaO, limestone ($CaCO_3$), dolomite (magnesium calcium carbonate) or dolomitic lime (product obtained from burning or roasting of dolomite). As used in the specification and claims, the word "lime" refers to any of the foregoing materials.

Lime is a primary flux which aids in the formation of slag fostering those pyrochemical reactions which effect elimination of impurities from molten metal. Lime is used as a flux in solid, particulate form and reacts with impurities in the charge to form a slag. The development of slag is adversely affected by reactions between lime and silica or silicates present in the charge, which result in formation of dicalcium silicate, a refractory material having a melting point of about 3800°F. Since lime is customarily used in particulate form, the dicalcium silicate tends to coat the particles, inhibiting their dissolution, slowing the rate of slag development and causing an increase in the viscosity of the slag.

It has become conventional in making iron and steel to use an auxiliary flux for the purpose of facilitating the reaction between lime and silica or silicates. Fluorspar is a material commonly used for this purpose. Fluorspar is expensive and it is in relatively short supply. The heat of the metallurgical reaction causes it to break down forming toxic fluorine compounds which are a source of air and water pollution. Thus, the art has sought and continues to seek alternative materials for fluorspar.

It is an object of this invention to provide a method of accelerating the reactivity between lime and silica or silicates in the production of iron or steel. Further objects of this invention are to replace fluorspar as an auxiliary flux, increase the fluidity (decrease viscosity) of the slag, provide economic advantages by eliminating the need for costly fluorspar, eliminate toxic air and water pollutants and effect an overall increase in efficiency of the process for making iron or steel.

In accordance with the present invention, methods for the production of iron or steel using lime as a primary flux may be significantly improved through use of a lithium containing material as an auxiliary flux.

The auxiliary fluxes found useful in achieving a greatly increased rate of reaction between lime and silica or silicates in iron or steel making processes are lithium containing materials such as spodumene. Spodumene is a lithium aluminosilicate having the theoretical formula $Li_2O \cdot Al_2O_3 \cdot 4SiO_2$. A product known commercially as "chemical grade" spodumene contains about 6% $Li_2O$, 2% $Fe_2O_3$, 26% $Al_2O_3$ and 64% $SiO_2$. Another product available commercially as "ceramic grade" spodumene contains about 6.8% $Li_2O$. Other lithium containing materials include lithium minerals such as petalite which contains about 3.5 to 4.5% $Li_2O$, eucryptite which contains about 12% $Li_2O$, and pegmatite which contains about 1.5% $Li_2O$. The common denominator of lithium containing materials useful as auxiliary fluxes is the lithia or $Li_2O$ content of the materials, those materials having an $Li_2O$ content of from about 1.5% $Li_2O$, to about 12% $Li_2O$, preferably from about 3% $Li_2O$, to about 7% $Li_2O$, said percentages being by weight, based on the weight of the material, being preferred.

As an expected corollary, the amount of lithium containing material useful as an auxiliary flux will vary depending on the lithia content of the material utilized. Generally speaking, however, it is desired to utilize an amount of lithium containing material sufficient to maintain the slag in a fluid state by effecting dissolution of dicalcium silicate formed about particles of the primary flux, lime. For example, an amount of auxiliary flux necessary to maintain a fluid slag in a process for making iron in which lime is the primary flux, may range from about 0.25% to about 6%, preferably from about 0.25% to about 2%, by weight of the lithium containing material, based on the weight of metal in the charge. The amount of auxiliary flux necessary to maintain a fluid slag in making steel in which lime is the primary flux, may range from about 0.1 to 2%, preferably from about 0.1 to 0.8% of lithium containing material, based on the weight of metal in the charge.

Lithium containing materials react rapidly on contact with molten slag. The lithium containing materials may be introduced to the slag substantially simultaneously with the charging of the lime or at such time thereafter as it becomes necessary to effect an increase in the fluidity of the slag. Lime and the auxiliary flux can be added either separately or the auxiliary flux can be pre-mixed or pre-combined with the lime.

The lithium containing materials may be added in powder form or in the form of agglomerates in which particulate lithium containing materials are bonded with any well-known binders such as portland cement, for example, and shaped into briquettes. The increased weight of agglomerated or briquetted forms insures that the auxiliary flux arrives at the reaction zone in the iron or steel making process. The lithium containing materials may be used as auxiliary fluxes alone or they may be used in combination with other fluxes.

It has been found that lithium containing materials are especially desirable auxiliary fluxes, representing a significantly successful substitute for fluorspar, in processes for making iron and steel using lime as the primary flux. Full recognition of the surprising advantages obtained with use of lithium containing materials as an auxiliary flux requires an appreciation of the complex factors involved in use of lime as a flux.

Slag formed in the making of iron and steel properly functions to refine the molten metal by removing impurities which are deleterious to the resultant product. Generally speaking, the impurities removed by the slag are non-metallic compounds having widely varying physical and chemical characteristics.

Impurities desired to be removed from molten metal include ash arising from the combustion of coke in cupola and blast furnace production of iron; oxides generated through contact of molten metal with oxygen; inclusions inherent in the particular ore used to produce blast furnace iron or steel; components in refractory linings of furnaces, cupolas, ladles and other vessels used to contain molten metal; from alloying materials added in order to modify the physical characteristics of the finished product, and from contaminated scrap which is recycled and remelted in iron and steel. Most of these impurities unite forming a silicate-type slag; some, however, form and pass off as a gas, such as sulfur in the form of sulfur dioxide ($SO_2$) or hydrogen sulfide ($H_2S$). Still other impurities form a smoke or fume such as iron oxidizing to form iron oxide ($Fe_2O_3$) or silicon oxidizing to form silica ($SiO_2$).

Lithium containing materials are especially desirable auxiliary fluxes since they have the attribute of not only increasing the rate of reaction of the primary flux, lime, with silica or silicates, thereby aiding in the creation and maintenance of a fluid slag, but also because use of lithium containing materials provides important economic advantages for the producer of iron or steel. It has been found, for example, that less lithium containing material, on a weight basis, is required for satisfactory fluxing than is the case when fluorspar is used as an auxiliary flux. Also, spectrographic analyses of slags produced with use of lithium containing materials show that increased amounts of sulfur are removed from molten metal to the slag and retained in the slag. This means that less sulfur is emitted to the atmosphere as $SO_2$ or $H_2S$, an important consideration from an environmental point of view, and that less sulfur is contained in the iron or steel produced. Another important advantage obtained through use of lithium containing materials as a substitute for fluorspar lies in the elimination of pollution problems occasioned by emission of toxic fluorine or fluorides when fluorspar is used as an auxiliary flux. Lithium containing materials such as spodumene may also find use as a substitute for fluorspar in non-ferrous pyrometallurgical processes, e.g., smelting of copper ores.

Tests were made in an electric furnace to produce a high manganese steel. The charge of material to the furnace consists of 385 lbs. of limestone, 2 × 1, inch and 75 lbs. of iron ore as the bottom charge and a metal charge consisting of 6500 lbs. of steel scrap. Just after the carbon-boil and slag reducer addition had been made to the furnace, 25 lbs. of spodumene powder —50 +200 mesh, about 6% $Li_2O$ content, were added to the electric furnace. The addition of spodumene produced a fluid slag as demonstrated with use of a slag viscosimeter mold, a device which measures the relative fluidity of slag and is illustrated in Principles of Metal Casting 2nd Edition, p. 438 published by American Foundrymens' Society. Before adding spodumene to the charge, a sample of slag traveled a distance of 4 inches from the point of feed in the slag viscosimeter mold. A slag sample taken from the electric furnace after spodumene addition, traveled 7¾ inches from the point of feed in the slag viscosity mold. A medium carbon steel of good quality was produced.

Tests were made in a basic cupola used to produce high quality cast iron, cast iron having low levels of sulfur, phosphorous and carbon. Five charges were added to the cupola wherein spodumene was substituted for fluorspar. A typical spodumene containing charge consists of 500 lbs. of auto scrap, 400 lbs. of steel scrap, 1100 lbs. of scrap pipe, 400 lbs. of coke, 170 lbs. of limestone, 40 lbs. of ferrosilicon and 25 lbs. of spodumene. Typical charges earlier in the heat contained 50 lbs. of fluorspar. A sample of slag taken before the spodumene reached the melting zone in the cupola traveled a distance of 1¾ inches from the point of feed in a slag viscosimeter mold. A slag sample taken after spodumene reached the melting zone traveled a distance of 6 inches from the point of feed in a slag viscosimeter mold. The cast iron produced was of good quality.

In a similar test in a basic cupola wherein 20 lbs. of spodumene were substituted for 30 lbs. of fluorspar in the charge, a slag sample taken before spodumene reached the melting zone traveled a distance of 5 inches from the point of feed in a slag viscosimeter mold. A slag sample taken after spodumene reached the melting zone traveled a distance of 6½ from point of feed in a slag viscosimeter mold.

Having thus described the invention what is claimed is:

1. In the pyrometallurgical production of iron and steel from an iron-containing material in which a slag which functions to refine the molten metal by removing impurities is formed in situ by reaction of the primary flux lime with silica and silicate impurities in said iron-containing material, the improvement which comprises using a material which consists essentially of a lithium-containing mineral as an auxiliary flux to promote reaction between the primary flux lime and said silica and silicate impurities and fluidize said slag.

2. The method of claim 1 wherein said lithium containing mineral is used in an agglomerated form.

3. The method of claim 1 wherein said lithium containing mineral is a member selected from the group consisting of spodumene, petalite, eucryptite and pegmatite.

4. The method of claim 3 where said lithium containing mineral is spodumene.

5. The method of claim 1 wherein the iron containing material is treated to produce cast iron.

6. The method according to claim 5 in which from about 0.25% to about 6% by weight of lithium-containing mineral, based on weight of metal in the charge, is used as an auxiliary flux.

7. The method according to claim 6 in which said lithium-containing mineral is spodumene.

8. The method of claim 1 wherein the iron containing material is treated to produce steel.

9. The method according to claim 8 in which from about 0.1% to about 2% of lithium-containing mineral, based on weight of metal in the charge, is used as an auxiliary flux.

10. The method according to claim 9 in which said lithium-containing mineral is spodumene.

* * * * *